United States Patent Office 2,862,830
Patented Dec. 2, 1958

2,862,830

QUICK-BREAKING BITUMINOUS EMULSIONS

Edward W. Mertens, El Cerrito, and Paul E. McCoy, Oakland, Calif., assignors to California Research Corporation, San Francisco, Calif., a corporation of Delaware No Drawing. Application July 1, 1953
Serial No. 365,516

6 Claims. (Cl. 106—277)

The present invention pertains to quick-breaking oil-in-water type bituminous emulsions and, more particularly, is directed to such emulsions containing adhesion promoting agents which have a marked tendency either to break the emulsions in whole or in part or to reduce its stability substantially.

Quick-breaking aqueous emulsions of a bituminous substance, for example, petroleum asphalt, are characterized by the property of quickly breaking down or separating and coalescing when diluted with water and/or mixed with electrolytes or contaminated with other foreign matter. Such emulsions are useful as adhesives, binding materials, and coating compositions and find particular utility in road building. When a quick-breaking emulsion is poured on aggregate or otherwise applied thereto, the emulsion breaks rapidly, the water is liberated, and the asphalt coats and binds the aggregate.

Often the dried asphalt film on the aggregate resulting from treatment with these emulsions is stripped off by subsequent water action. Heretofore, various additives, so-called "anti-stripping agents," have been proposed to counteract the stripping action of water by promoting a firm bond between the asphalt film and the aggregate.

There has long been a need for quick-breaking asphalt emulsions that would possess both anti-stripping characteristics and high viscosity. Emulsions of this type are especially desired for seal coating of pavement and in construction of macadam roads during inclement weather. The anti-stripping property is desired to insure against stripping of asphalt coating from surface aggregate due to rain storms which might occur during the early life of the pavement. High viscosity is desired to improve retention of surface stone and to minimize "run off" of binder on super elevated curves and steep grades. Such a product has not been available heretofore.

One very effective bonding agent for reducing the stripping of the deposited asphalt film from the aggregate is sodium dichromate. However, such use of sodium dichromate poses a serious difficulty with respect to quick-breaking oil-in-water type emulsions. Since these emulsions have a high demulsibility and, accordingly, are very sensitive to electrolytes, dust, foreign matter, and the like, the addition of useful amounts of sodium dichromate to such emulsions causes them to break or seriously impairs their stability in storage.

Various attempts have been made to incorporate sodium dichromate in quick-breaking emulsions such as by using larger amounts of emulsifying and/or stabilizing agents. This approach, however, has the disadvantage of being costly or converting the quick-setting emulsion to medium-setting emulsion or slow-setting emulsions or, in some instances, exceeding the non-asphaltic content of the asphaltic residue. Other proposals involve the use of special emulsification procedures and, by reason of this fact, are not entirely satisfactory and are somewhat limited in their application, particularly to high viscosity, high residue, quick-breaking emulsions.

We have found that sodium dichromate can be readily incorporated into quick-breaking, oil-in-water type bituminous emulsions by means of small amounts of salts of certain organo-substituted phosphoric acids. The use of these phosphoric acid salts permits the incorporation of adhesion-promoting amounts of sodium dichromate even in high viscosity, high residue emulsions of the quick-breaking, oil-in-water type.

The resulting emulsions form strong bonds between the asphalt film deposited therefrom and the aggregate. The increased adhesion is due not only to the dichromate content, but also to the presence of the phosphoric acid salts, which either themselves contribute an improved bonding action or enhance the adhesion-promoting effect of the dichromate. That the phosphoric acid salts should improve the adhesion is not predictable since the prior art teaches, for example, that active phosphorus salts in liquid, i. e., emulsified, asphalt must be in the free acid form in order to be effective; in fact, the sodium salt does not appreciably improve the adhesion properties of liquid asphalts. Further, it is rather surprising that the strong emulsion-breaking tendencies of sodium dichromate could be counteracted with the phosphoric acid salt in the small amounts here employed since heretofore dichromate could not be readily added to emulsions unless enough emulsifier and/or stabilizers was used to make the emulsions slow—or at least medium—setting.

These salts of organo phosphoric acids and especially the salts of phosphated hydroxy fatty oils appear to be superior agents for the present purposes. Thus, these phosphoric acid salts, as compared to salts of other acids of phosphorus, are generally less sensitive to variations in the mineral content of the water used in the emulsification and to variations in the preparation of the acids which may result in presence of extraneous materials. As a result of this insensitivity, the present salts often are superior with respect to emulsion properties such as dispersed particle size, sedimentation, etc. Further, the present agents usually bring about a smaller decrease in the viscosity of high residue emulsions. Also, the present phosphoric acid salts have a greater permanence, i. e., longer retention, of adhesion-promoting effect upon storage.

Thus, according to the present invention, the phosphoric acid salts are combined with dichromate in quick-breaking emulsions for the dual function of offsetting the strong emulsion-breaking tendency of the dichromate and of increasing the adhesion of the deposited asphalt film to the hydrophilic aggregate. And as indicated above, these objects are attained while retaining the other characteristics of the emulsions at satisfactory levels.

The quick-breaking emulsions of the present invention can be prepared by methods well known in the art. For example, if asphalts are available which are emulsifiable in hot dilute aqueous caustic alkali solution without the aid of an added emulsified agent, they may be emulsified by the methods of Montgomerie U. S. Patent 1,643,675 and Braun U. S. Patent 1,737,491. While these Montgomerie type asphalts are most advantageously employed in the present invention, satisfactory emulsions can also be prepared from other types of asphalt by the use of a very small amount (e. g. 0.05 to 0.1% based on the weight of the emulsion) of saponifiable material such as oleic acid, Vinsol Resin, or rosin oil. Vinsol Resin is the trade-name of a product of Hercules Powder Company, and is a solvent-extracted, petroleum hydrocarbon insoluble pinewood resin which is further identified in Buckley U. S. Patent No. 2,256,886. Often the adhesion of the quick-breaking emulsions is greater in the absence of such added saponifiable material and, hence, the Montgomerie type asphalts are preferred.

The bituminous materials emulsified in accordance with the present invention are normally solid, semi-solid, or viscous liquids at ordinary atmospheric temperatures. A classification of the suitable bituminous substances contemplated by the present invention appears in U. S. Patent No. 2,396,669. Examples of operative materials are bitumens, such as petroleum and native asphalts, native mineral waxes, asphaltites; pyrogenous distillates such as petroleum paraffin, oil-gas tar, coal tar; pyrogenous residues such as blown petroleum asphalts, sludge asphalts, pressure tars, residual oils, oil-gas tar pitch, etc. Of these materials, petroleum asphalt is most advantageously used, and it may be produced by steam refining, by air-blowing, by solvent extraction methods, or by a combination of such methods. If desired, the bitumen may be combined with a bitumen solvent such as an aromatic hydrocarbon mixture before emulsification. Emulsions of the other bituminous materials are susceptible to improvement by the procedure of the invention, and hence are within the broader scope of the present invention.

The emulsions, however prepared, will usually contain about 55% to 67% by weight of asphalt or other dispersed material based upon the finished emulsion composition although the quantity of dispersed material can, under some circumstances, be either higher or lower. For low residue emulsions, 55% to 60% asphalt is usually specified; whereas 62% to 67% is normally called for in high residue emulsions. The ASTM D401-40 specification for quick-setting asphalt emulsions specifies a viscosity (Saybolt Furol at 77° F.) of not less than 20 nor more than 100 seconds, a residue of not less than 55 nor more than 60%, a demulsibility (35 mls. 0.02 N. calcium chloride) of not less than 60% and a sieve test (20 mesh) of not more than 0.1%. Ordinarily, emulsions meeting these specifications will be used. However, since specifications are subject to change from time to time, and since requirements may vary from place to place, the properties of the quick-breaking emulsion can vary in one or more respects from those of the above preferred set of specifications. Along with the asphalt, sufficient water is employed to form the desired emulsion; generally from 50 to 70 parts of asphalt are used with 30 to 50 parts of water.

In addition to sodium dichromate, which is preferred, other water-soluble salts of oxy-acids of chromium can be employed, the alkali chromates such as lithium, sodium or potassium chromate and, more especially, the dichromates being preferred; in some instances, the chromium oxy-acids may be used as salts of ammonia, or water-soluble amines. The chromates are employed in adhesion-promoting amounts, generally in amounts which are normally sufficient to break the quick-breaking emulsions. Ordinarily, the amounts will range from 0.05 to 0.5% and preferably 0.05 to 0.25% by weight.

The phosphoric acid salts to be employed in combination with the adhesion-promoting chromates in the quick-breaking emulsions of the present invention are the alkali metal salts of organo-substituted oxy phosphoric acids containing at least 8 and up to about 40 carbon atoms, wherein the organo portion can be acylic-aliphatic, cyclo-aliphatic (or other cyclic non-benzenoid radical), alkyl-aryl or aryl-alkyl radicals, of which the aliphatic radicals are preferred. Specific examples of the alkali metal salts of organo-substituted acids of phosphorus which may be employed in accordance with present invention are the alkali metal salts, e. g., sodium, potassium, or lithium salts of: partially esterified ester acids of pentavalent phosphorus, such as hexyl, monohexyl, phenyl, monododecyl, monocetyl, and mono-octadecyl esters of phosphoric acids; phosphoric acids resulting from phosphating various hydroxy-containing esters such as ricinoleic acid esters of polyhydric alcohols such as ethylene glycol, propylene glycol, glycerin or polymers thereof; crude or purified reaction products of phosphorus oxides with hydroxy fatty acids or glycerides thereof, the complex phosphated materials derived from hydroxy fatty acids such as 12-hydroxystearic acid, hydroxymyristic acid, hydroxypalmitic acid, hydroxybehenic acid, ricinoleic acid, etc., or from glycerides thereof, such as castor oil or hydrogenated castor oil, or from other hydroxy-containing fatty oils; etc. In preparing the salt from phosphated castor oil sufficient alkali is employed to react with and neutralize the phosphoric acid group and in some instances also the carboxylic acid groups, if any, which may be released by hydrolytic splitting of the glycerides, thus giving a complex reaction product containing liberated glycerine, unreacted castor oil, salts of the various acids, etc. Ordinarily, the higher molecular weight phosphoric acid salts, i. e., those having organic chain lengths greater than about 12 carbon atoms, are preferred, since these generally give greater adhesion. Also, particularly with the more sensitive high viscosity, high residue emulsions, higher viscosity emulsions are obtained with the organo phosphoric acid salts wherein the organo group has a molecular weight above 200 and especially above 235. Of the phosphated fatty oils, the complex reaction products derived from phosphated castor oil are preferred.

The alkali metal salts of organo-substituted oxy phosphoric acids are employed in amounts sufficient to counteract the tendency of said water-soluble salt of an oxy-acid of chromium to break the quick-breaking emulsion. Usually only small amounts ranging from about 0.02 to 0.5 or up to 1.0% and preferably 0.04 to 0.2% are required. However, in some instances, higher concentrations of the phosphorus salt can be employed to advantage; generally, the various emulsion properties such as viscosity, are more readily adjusted with the lower minimum amounts of phosphorus salts.

As indicated above, sufficient alkali metal hydroxide is incorporated in the emulsion to neutralize the phosphoric acids and acidity due to the presence of oxy-acids of chromium, and, additionally, to give a pH which is alkaline but below a critical maximum. While quick-breaking oil-in-water type emulsions generally have a pH of at least 12 and usually above 13, the quick-breaking emulsions of the present invention have an alkali content such that the pH is less than 12.2 and preferably in the range of 10 to 11.8. More generally, the minimum alkali concentration is that required in combination with the phosphoric acid salt for forming or preserving the emulsion. Within this general limitation, the amount of alkali should be sufficient to give from about 0.01 to 0.06%, preferably from 0.03 to 0.05% by weight, excess alkali over that necessary to neutralize the organic phosphoric acids and any relatively strong acids present. In any case, when forming quick-breaking emulsions in accordance with the present invention, the amount of alkali above the minimum is less than that which brings about a reduction of the demulsibility below 55 to 60% as measured in the ASTM D244-42 demulsibility test. Usually, the total amount of alkali required is less than about 0.15%, preferably less than 0.10% of NaOH by weight of the asphalt emulsion. Suitable proportions of other alkalis and suitable proportions of alkali based upon finished emulsions containing other amounts of asphalt can be readily calculated.

As stated, the quick-breaking emulsion of the present invention has incorporated therein the above defined amounts of sodium dichromate or other water-soluble salt of an oxy-acid of chromium plus a phosphoric acid salt plus alkali, whereby superior adhesion of the asphalt to aggregate is obtained in a quick-breaking emulsion. Preferably the organo-substituted phosphoric acid salt is added, prior to emulsification, to the alkaline water containing sufficient alkali to give the required pH in the final emulsion. Thereafter, molten asphalt at about 230° to 280° F. is admixed with hot (130 to 180° F.) aqueous alkaline solution (containing added emulsifier, if any) in an open mix pot with a propeller-type agitator, whereupon emulsification quickly takes place. Alternately, the procedure of Braun U. S. Patent 1,734,791 may be employed; that is, to a seed batch of previously formed emulsion are added simultaneously the molten asphalt and the hot aqueous alkali and a portion of the emulsion thus produced is used as a seed batch for making a further quantity of emulsion. Or the molten asphalt and hot aqueous alkali may be fed simultaneously to a colloid mill in which the ingredients are subjected to the powerful shearing forces of two surfaces moving relatively to one another. A suitable mill for this purpose is the well-known Charlotte mill, as described more fully on page 556 of "Asphalts and Allied Substances," 5th edition, by Abraham. Also, the phosphoric acid salt may be added to the asphalt before emulsification although this is less desirable because a uniform dispersion in water is attained more readily than in asphalt.

As indicated above, quick-breaking bituminous emulsions in order to fulfill their purpose efficiently should have certain properties such as good demulsibility, high adhesion to hydrophilic aggregate, and good storage characteristics. These properties are evaluated by certain tests which have been devised to serve as criteria for grading various emulsions.

Thus, the so-called "demulsibility" test described in ASTM D244–42 (demulsibility) is performed by mixing 100 grams of the emulsion with 35 ml. of 0.02 normal calcium chloride solution, and the percentage of asphalt broken out of the emulsion determined. Thereby, the ability of quick-breaking bituminous emulsions to break or separate on contact with the material to be coated can be evaluated. Most specifications for quick-breaking bituminous emulsions as described, for example, in ASTM D401–40 provide for about 60% emulsification in ASTM demulsibility tests D444–42 or higher.

One method of evaluating the adhesion of asphalt to aggregate is by the so-called "film stripping test." This test is a modification of the Nicholson film stripping test and is carried out as follows: 50 grams of the indicated aggregate, all passing a ⅜" sieve and evenly graded from No. 8 sieve to ⅜" is mixed with the asphalt emulsion under investigation. The amount of asphalt employed is 12 grams which is added to the aggregate. The mixture is stirred thoroughly until all the aggregate is coated, and then is allowed to cure overnight in an oven held at 220° F. Thereafter, the treated aggregate sample is placed in an eight-ounce screw-cap glass jar with 175 ml. of pure water and the jar agitated in a shaking machine at 45–50 revolutions per minute for fifteen minutes at a temperature of 120° F. At the end of this period the percentage of coated aggregate is visually estimated and noted.

Another adhesion test is the so-called "Boiling Test" which is carried out as follows: 100 grams of dry standard Massachusetts Rhyolite (obtained from the Central Scientific Company, Cambridge, Massachusetts), graded so as to pass entirely through a 1" sieve and to be retained completely on a No. 10 sieve were taken. This aggregate was heated to a temperature of 275°–325° F. and mixed with 12 grams of the test emulsion until complete coating resulted. Two 50-gram samples of the coated aggregate were then taken and each spread thinly on a metal can lid and placed in an oven for 24 hours at a constant temperature of 220° F. At the end of this curing period each 50-grams sample was dropped into 400 cc. of boiling distilled water in a 600 cc. beaker and stirred one minute at the rate of 60 times a minute, boiling meanwhile being continued. Each beaker was then removed from the heat and after ebullition ceased, cold water was run into the beaker through a submerged hose until any film of asphalt on the surface of the water was flushed out. Then each sample was removed and placed on absorbent paper and air-dried. The dried samples were then inspected visually by an experienced observer to estimate the percentage area coated, uncoated area being deemed that retaining no asphaltic coating. The figures for the two samples were then averaged.

Another adhesion test is the "oven test" which is the above-described Boiling Test modified in the following respects: cold Massachusetts Rhyolite is coated with 8% of an emulsion previously heated to 120° F. The mixture is cured in an oven at 200° F. for 24 hours, then stirred one minute in 400 cc. of boiling distilled water and the floating asphalt film thereafter is removed by blotting with absorbent paper. The samples are then visually examined for percentage of surface coated; those having 75% or more of aggregate surface coated and said to pass the test.

Another adhesion test is the "lamp method" which is carried out as follows: 100 grams of Massachusetts Rhyolite, heated at 325° F. in a 6" diameter Petri dish, is combined with 8 grams of the emulsion and mixed for one minute under an infra-red lamp. The dish is then placed under a bank of infra-red lamps for two hours. Thereafter, the sample is re-mixed for one minute, while still under the lamp. 50 grams of the sample is then placed in 400 cc. of vigorously boiling distilled water and stirred for one minute. Cold water is introduced by hose beneath the surface and excess asphalt is floated off. The water is decanted and the aggregate placed on blotting paper. After surface drying, the area of coated aggregate is visually estimated.

A test employed in determining the homogeneity of the emulsions is the so-called "sieve test," described, for example, in ASTM D244–42. According to this test, a previously weighed No. 20 sieve having a 3-inch frame of the U. S. Standard Sieve Series is first wet with a 2% sodium oleate solution, after which there is poured therethrough exactly 1,000 grams of the emulsified asphalt. The container and the residue on the sieve are washed thoroughly with the sodium oleate solution until the washings run clear. A previously weighed tin box cover or shallow metal pan of approximate size to fit over the bottom of the sieve is placed under the sieve and heated for two hours in a drying oven whose interior temperature is 200° F., then cooled in a desiccator and weighed. The total weight of the sieve pan and residue in grams less the combined tare weight of the sieve and the pan is the weight of the residue by the sieve test. This percentage of residue in the emulsion is calculated on the basis of this weight. Ordinarily, a satisfactory emulsion will have a test value of not more than 0.01%.

A test for indicating the amount of asphalt deposited from an emulsion is the so-called "residue test," which is described in ASTM D244–42 (distillation), residue specifications usually calling for a residue between about 55 and 60%.

As illustrative of the practice of the present invention, the following specific examples are given:

*Example 1.*—One-ton batches of quick-breaking emulsions were prepared in a plant-size mix pot by the Montgomerie method, using the following ingredients: 1300 pounds of a 230 penetration California asphalt refined from a San Joaquin Valley crude petroleum, 2.3 pounds sodium hydroxide, 3.0 pounds sodium dichromate, 5.0 pounds bentonite clay, and the remainder, except for the below-indicated amounts of phosphated castor oil, being sufficient water to make one ton total. The phosphated castor oil was prepared by reacting one mol of $P_2O_5$ with about one mol of castor oil under relatively mild conditions in the temperature range of 250–275° F. (one batch preparation was used in test 1 and a different batch in tests 2 and 3). All the resulting emulsions were excellent quick-breaking emulsions of high viscosity, high demulsibility, and high adhesion, as shown by the test results given in the following table:

Table I

| Test No. | 1 | 2 | 3 |
|---|---|---|---|
| Amount of Phosphated Castor Oil (Pounds) | 1.0 | 1.0 | 2.0 |
| Viscosity at 122° F., Saybolt seconds Furol | 253 | 224 | 280 |
| Demulsibility | 66.0 | 89.6 | 82.2 |
| Adhesion—Boiling Test | 100 | 95 | 90 |
| Residue | 65.8 | 66.4 | 66.4 |
| Sieve | .065 | .06 | .06 |

*Example 2.*—A series of emulsions were prepared from a Venezuelan asphalt in plant scale equipment by the Montgomerie method and employing 63 parts of asphalt, 0.125 part of bentonite clay, 0.10 part of sodium dichromate, varying amounts, as indicated below, of potassium hydroxide and phosphated castor oil, and sufficient water to make a total of 100 parts. The amount of potassium hydroxide in the emulsifying water after addition of all the ingredients except asphalt before emulsification was obtained by titration with 0.1 N hydrochloric acid. In runs 1 through 13, a mix pot was used in the emulsification and in runs 14 to 16 a Charlotte colloid mill (as referred to hereinabove) was employed. The amounts, in parts by weight, of the varying ingredients and the test data on the resulting emulsions are shown in the following table:

Table II

| Run Number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Phosphated Castor Oil | 0.0 | 0.05 | .05 | .05 | .05 | .05 | .05 | .05 | .05 | .05 | .05 | .05 | .05 | .05 | .05 | .05 |
| Potassium Hydroxide | .062 | .048 | .048 | .052 | .052 | .057 | .057 | .063 | .063 | .071 | .071 | .075 | .075 | .050 | .052 | .050 |
| Residue | 62.6 | 63.6 | 66.6 | 63.6 | 65.2 | 64.4 | 65.8 | 64.4 | 66.0 | 64.2 | 65.5 | 64.6 | 66.0 | 64.6 | 60.2 | 62.8 |
| Demulsibility | 100 | 100 | | 99.6 | | 99.8 | | 100 | | 100 | | 99.8 | | 100 | 100 | 99.8 |
| Viscosity S. S. Furol: | | | | | | | | | | | | | | | | |
| Immediate at 122° F | 250 | 320 | 310 | 320 | 371 | 454 | 726 | 418 | 522 | 359 | 391 | 392 | 457 | 546 | 97 | 394 |
| After— | | | | | | | | | | | | | | | | |
| 1 day, room temp | 187 | 211 | 285 | 330 | 265 | 250 | 680 | 263 | 317 | 216 | 257 | 156 | 127 | 641 | 137 | 465 |
| 1 day, 140° F | 200 | 448 | 362 | 373 | 506 | 483 | 661 | 310 | 597 | 410 | 351 | 310 | 215 | 778 | 134 | 834 |
| 7 days, room temp | 270 | 360 | 307 | 367 | 384 | 638 | 835 | 309 | 658 | 208 | 292 | 232 | 185 | 514 | 128 | 577 |
| 7 days, 140° F | 154 | 370 | 337 | 276 | 321 | 486 | 453 | 216 | 664 | 458 | 251 | 274 | 86 | 809 | 124 | 833 |
| 14 days, room temp | 190 | 265 | 288 | 318 | 400 | 480 | 408 | 270 | 325 | 185 | 350 | 243 | 130 | | | |
| 14 days, 140° F | 259 | 330 | 497 | 404 | 402 | 525 | 950 | 367 | 736 | 406 | 402 | 275 | 305 | | | |
| 21 days, room temp | 141 | 255 | 270 | 335 | 321 | 425 | 355 | 250 | 258 | 205 | 232 | 175 | 155 | 593 | 147 | 607 |
| 21 days, 140° F | 227 | 320 | 420 | 395 | 550 | 578 | 699 | 490 | 651 | 435 | 447 | 377 | 270 | 927 | 153 | 861 |
| Adhesion—Stored 1 day at 77° F.: | | | | | | | | | | | | | | | | |
| Boiling Test Percent | 60 | 95 | 95 | 80 | 95 | 90 | 75 | 70 | 75 | 50 | 70 | 50 | 50 | 90 | | 75 |
| Oven Method do | 80 | 98 | 99 | 95 | 98 | 98 | 98 | 85–90 | 90 | 90 | 85 | 75 | 65 | 90 | | 90 |
| Adhesion—Stored 21 days at 140° F.: | | | | | | | | | | | | | | | | |
| Boiling Test Percent | 65 | 95 | 98 | 80 | 85 | 85 | 85 | 85 | 60 | 65 | 70 | 70 | 70 | 85 | | 80 |
| Oven Method do | 80 | 98 | 95 | 95 | 95 | 95 | 90 | 85 | 90 | 85 | 75 | 75 | 75 | 90 | | 90 |

*Example 3.*—Another emulsion was prepared from 63.0 parts of a 150/200 penetration Venezuelan asphalt, 0.15 part potassium hydroxide, 0.25 part potassium dichromate, 0.05 part phosphated castor oil, 0.10 part Vinsol Resin (an alcohol-soluble, gasoline-insoluble pinewood resin), 0.25 part bentonite clay and 36.20 parts of water. The resulting emulsion was an excellent high viscosity, high bonding, quick-breaking emulsion, which gave the following test data: 89.6% demulsibility, 95% adhesion (lamp method), 425 S. S. F. viscosity at 122° F., a residue of 65.0%, and a sieve test of 0.02%.

*Example 4.*—An emulsion was formulated with 63 parts of a 200/300 penetration California asphalt refined from San Joaquin Valley crude petroleum, 0.2 part phosphated castor oil, 0.1 part sodium dichromate, 0.25 part bentonite clay, 0.07 part titratable sodium hydroxide and sufficient water to make a total of 100 parts. The resulting emulsion had a viscosity of 278 Saybolt seconds Furol at 122° F. and a 90% adhesion (boiling test).

As will be appreciated by those skilled in the art, the quick-breaking oil-in-water type emulsion herein contemplated may be converted into slow-setting or mixing type emulsions by the treatment thereof with a stabilizing agent or protective colloid such as blood, glue, casein, starch, and various gums, for example, gum acacia, agar-agar, etc., or with additional quantities of soap-forming acids and proportionately-increased amounts of alkali.

Obviously, many variations and modifications of the invention, as hereinbefore set forth, may be made without departing from the spirit and scope thereof, as defined in the following claims.

We claim:

1. A quick-breaking oil-in-water type emulsion having improved bonding characteristics toward hydrophilic aggregate, consisting essentially of water and a bituminous material emulsified therein; and an alkali metal chromium salt selected from the group consisting of chromates and dichromates in an amount from 0.05 to 0.5% by weight sufficient to promote substantially the adhesion to hydrophilic aggregate of the asphalt coating formed from the emulsion, said amount of chromium salt normally tending to break quick-breaking emulsions; an alkali metal salt of a phosphated ricinoleic acid ester formed from a glycol selected from the group consisting of ethylene glycol, propylene glycol and glycerine in an amount from 0.02 to 1.0% by weight sufficient to counteract the tendency of said chromium salt to break the emulsion without adversely affecting the quick-breaking properties of the emulsion; and a water-soluble alkali in sufficient amount to give the aqueous phase of the emulsion an alkaline pH but less than that which, together with the chromium salt and phosphorus salt, reduces the demulsibility below 55% as measured in the ASTM D244–42 (demulsibility) test.

2. The emulsion of claim 1 wherein said ricinoleic acid ester is a ricinoleic acid ester of ethylene glycol.

3. The emulsion of claim 1 wherein said ricinoleic acid ester is a ricinoleic acid ester of propylene glycol.

4. The emulsion of claim 1 wherein said chromium salt is sodium dichromate.

5. A quick-breaking oil-in-water type emulsion having improved bonding characteristics toward hydrophilic aggregate, consisting essentially of water and a bituminous material emulsified therein; and an alkali metal chromium salt selected from the group consisting of chromates and dichromates in an amount from 0.05 to 0.5% by weight sufficient to promote substantially the adhesion to hydrophilic aggregate of the asphalt coating formed from the emulsion, said amount of chromium salt normally tending to break quick-breaking emulsions; an alkali metal salt of phosphated castor oil in an amount from 0.02 to 1.0% by weight sufficient to counteract the tendency of said chromium salt to break the emulsion without adversely affecting the quick-breaking properties of the emulsion; and a water-soluble alkali in sufficient amount to give the aqueous phase of the emulsion on alkaline pH but less than that which, together with the chromium salt and phosphorus salt, reduces the demulsibility below 55% as measured in the ASTM D244–42 (demulsibility) test.

6. The emulsion of claim 5, having a sufficient amount of a bituminous material to give a high viscosity emulsion and a residue test result ranging from about 60 to 67%.

References Cited in the file of this patent

UNITED STATES PATENTS

| | | |
|---|---|---|
| 1,757,083 | Halvorsen | May 6, 1930 |
| 1,900,973 | Bertsch | Mar. 14, 1933 |
| 1,991,393 | Joyce | Feb. 19, 1935 |
| 2,247,722 | Chadder | July 1, 1941 |
| 2,393,573 | Sommer | Jan. 27, 1946 |
| 2,412,526 | McCoy | Dec. 10, 1946 |
| 2,412,545 | Watts | Dec. 10, 1946 |
| 2,592,564 | Hardman | Apr. 15, 1952 |
| 2,670,304 | McCoy | Feb. 23, 1954 |